(12) United States Patent
Furugen (10) Patent No.: US 6,935,377 B2
(45) Date of Patent: Aug. 30, 2005

(54) HIGH-PRESSURE FUEL INJECTION PIPE HAVING CONNECTING HEAD

(75) Inventor: Munekatsu Furugen, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 71 days.

(21) Appl. No.: 10/731,654

(22) Filed: Dec. 9, 2003

(65) Prior Publication Data

US 2004/0135368 A1 Jul. 15, 2004

(30) Foreign Application Priority Data

Dec. 11, 2002 (JP) ........................................ 2002-359643

(51) Int. Cl.$^7$ .................................................. F16L 9/00
(52) U.S. Cl. ....................... 138/109; 138/177; 138/178; 285/386; 285/353; 285/384
(58) Field of Search ................................ 138/109, 177, 138/178, DIG. 11; 285/386, 353, 384, 385; 123/468

(56) References Cited

U.S. PATENT DOCUMENTS

| | | | |
|---|---|---|---|
| 193,993 A | 8/1877 | Pennie | 285/148.11 |
| 1,862,833 A | 6/1932 | Stover | 285/249 |
| 1,982,533 A | 11/1934 | Parker | 285/248 |
| 3,025,086 A | 3/1962 | Mosely | 285/250 |
| 4,134,430 A * | 1/1979 | Mukasa et al. | 138/109 |
| 4,266,577 A * | 5/1981 | Usui | 138/109 |
| 4,900,180 A | 2/1990 | Takikawa | 403/233 |
| 5,109,888 A * | 5/1992 | Usui | 138/109 |
| 5,402,829 A | 4/1995 | Takikawa et al. | 138/109 |
| 5,423,581 A | 6/1995 | Salyers | 285/382 |
| 5,709,413 A | 1/1998 | Salyers | 285/219 |
| 5,903,964 A | 5/1999 | Uematsu et al. | 29/456 |
| 5,957,507 A | 9/1999 | Asada | 285/189 |
| 5,979,945 A | 11/1999 | Hitachi et al. | 285/125.1 |
| 6,070,618 A | 6/2000 | Iwabuchi | 138/143 |
| 6,186,121 B1 | 2/2001 | Uematsu et al. | 123/468 |
| 6,415,768 B1 * | 7/2002 | Usui | 123/468 |
| 6,824,173 B2 * | 11/2004 | Usui | 285/353 |
| 6,840,283 B2 * | 1/2005 | Furugen et al. | 138/109 |

* cited by examiner

Primary Examiner—Patrick Brinson
(74) Attorney, Agent, or Firm—Gerald E. Hespos; Anthony J. Casella

(57) ABSTRACT

A high-pressure fuel injection pipe has a connecting head with an outer circumference formed for a mating seat portion. A shallow annular groove is formed in the inner side of the connecting head while shaping the head. A connecting washer is fit on the outer circumference of the lower neck of the connecting head. The injection pipe is characterized in that the lower neck of the connecting head is provided with an at least two-stepped portion having no slope, and in that the connecting washer is provided with a stepped portion corresponding at least partially to the stepped portion of the connecting head, so that the stepped portions may abut against each other.

11 Claims, 8 Drawing Sheets

PRIOR ART

FIG. 13

PRIOR ART

FIG. 14

PRIOR ART

HIGH-PRESSURE FUEL INJECTION PIPE HAVING CONNECTING HEAD

TECHNICAL FIELD

The present invention relates to a high-pressure fuel injection pipe having a connecting head, which is frequently used as a fuel feed passage in a diesel engine, for example, and which has the connecting head made of a thick steel pipe having a relatively small diameter of 4 mm to 20 mm and a thickness of about 1 mm to 8 mm.

BACKGROUND ART

Figure 12:
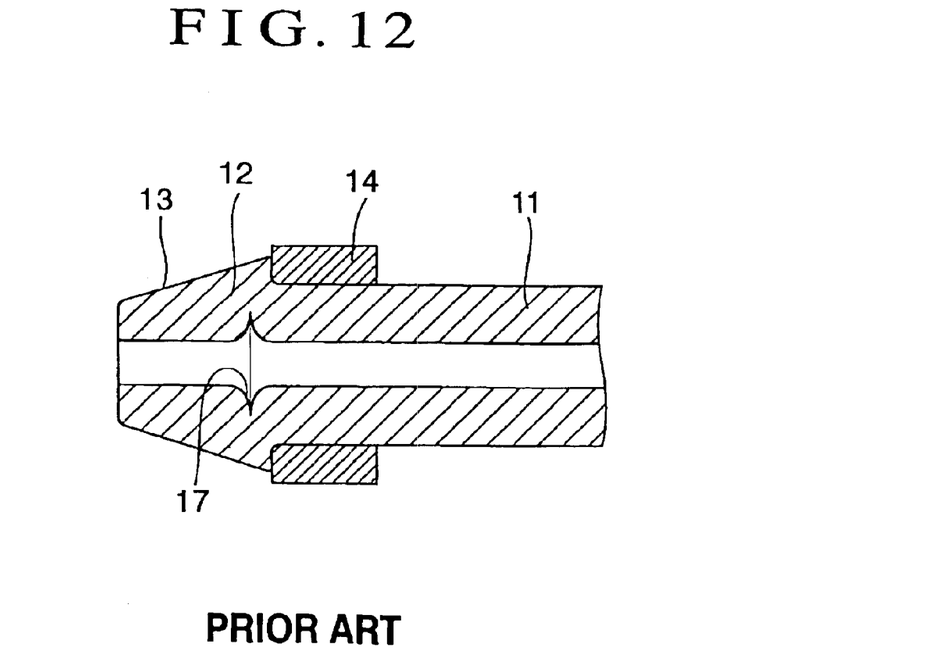
FIG. 12 is a longitudinal section showing one example of the connecting head of a high-pressure fuel injection pipe of the prior art.
Figure 13:
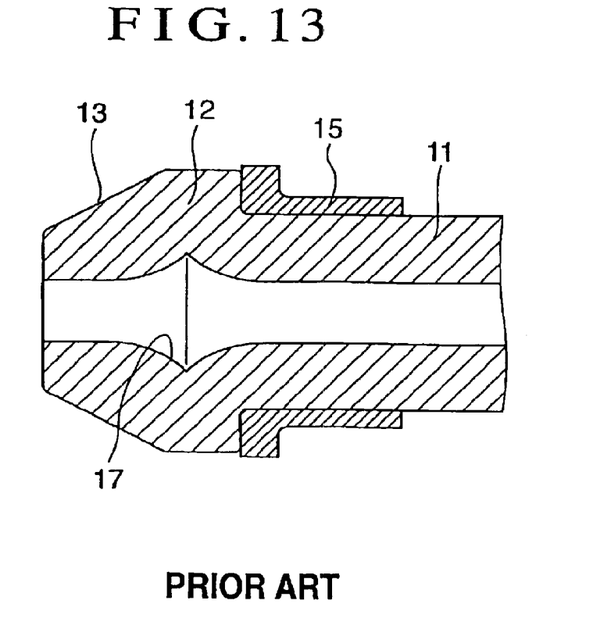
FIG. 13 is a longitudinal section showing another example of the connecting head of a high-pressure fuel injection pipe of the prior art.

In the high-pressure fuel injection pipe having the connecting head of that kind in the prior art, as shown in FIG. 12 and FIG. 13, as a frustrum connecting head 12 having a seat face 13 formed of an outer circumference at the end portion of a thick steel pipe 11 is shaped by a buckling work to push it in the pipe axis direction from the outside with a punch member, a deep and large annular sharp wrinkle or pocket 17 is formed in the head inner circumference by the outward expansion accompanying the buckling work of the pushing operation. On the lower neck portion of the connecting head 12, on the other hand, there is fitted a washer (i.e., a connecting washer) 14 or a sleeve washer (i.e., a connecting washer) 15 either as a part necessary for applying an axial force effective for mounting the connecting head 12 on a mating seal face or as a reinforcement when vibrations occur.

DISCLOSURE OF THE INVENTION

However, this high-pressure fuel injection pipe of the prior art having the connecting head is troubled by a problem that the deep and large annular sharp wrinkle or pocket 17 formed in the head establishes a point to start the fatigue failure due to the high-pressure fluid when the injection pipe is arranged for use.

Figure 14:
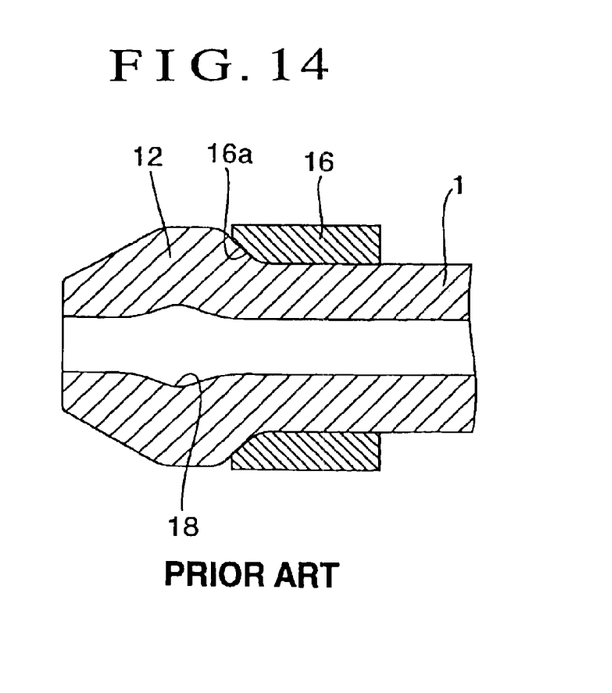
FIG. 14 is a longitudinal section showing still another example of the connecting head of a high-pressure fuel injection pipe of the prior art.

In order to solve this problem, therefore, we have proposed a high-pressure fuel injection pipe using a contact type connecting washer 16, which is provided with a chamfered portion 16a of a flat slope on the side of the connecting head to cover the outer circumference (or the back face) of the lower neck portion of the connecting head 12, as shown in FIG. 14.

In the case of this high-pressure fuel injection pipe, by the action of the connecting washer 16 having the chamfered portion 16a to cover the outer circumference of the lower neck portion of the connecting head 12, the sharp wrinkle or pocket to be easily formed in the inner side of the head by the buckling work can be formed into an annular groove 18 having a shallow and gentle section. As a result, there is attained an effect to reduce the possibility of starting the fatigue failure due to the concentration of stress in the head.

In the aforementioned case of the high-pressure fuel injection pipe shown in FIG. 14, however, as the injection pressure rises to increase the axial force necessary for the sealing purpose, the washer or sleeve washer is easily deformed by the axial force thereby to raise a problem that a sufficient seal face pressure cannot be obtained. In the connecting washer 16 having the chamfered portion 16a of the flat slope shown in FIG. 14, more specifically, the circumferential stress to act on the washer or sleeve washer is raised by the wedge effect of the chamfered portion 16a. Therefore, the washer or sleeve washer is plastically deformed to a larger external diameter so that to interfere with the inner circumference of a box nut. As a result, the seal face pressure drops to degrade the seal performance.

The present invention has been conceived to solve the aforementioned problems of the high-pressure fuel injection pipe shown in FIG. 14, and has an object to provide a high-pressure fuel injection pipe, which has a connecting head for a high seal performance by preventing a washer or sleeve washer from being plastically deformed.

In order to achieve the above-specified object, according to the invention, there is provided a high-pressure fuel injection pipe having a connecting head, comprising: a thick steel pipe having a relatively small diameter and provided at its connecting end portion with a connecting head having an outer circumference formed into a seat face of either a frustrum shape or a frustrum shape having a spherical leading end portion for a mating seat portion, such that an annular groove formed in the inner side of the connecting head in accordance with the shaping of the head is made shallow and gentle; and a connecting washer fitted on the outer circumference of the lower neck portion of the connecting head. The injection pipe is characterized in that the connecting head is provided on the outer circumference of its lower neck portion with an at least two-stepped portion having no slope, and in that the connecting washer is provided with a stepped portion corresponding wholly or partially to the stepped portion of the connecting head, so that the stepped portions may abut against each other.

Moreover, the high-pressure fuel injection pipe is characterized in that the stepped portion formed on the back face of the connecting head has two to five steps. Still moreover, the high-pressure fuel injection pipe is characterized in that the connecting washer is of either an integral type or a split type including a plurality of thin sleeves having different diameters. Furthermore, the high-pressure fuel injection pipe is characterized: in that the connecting washer is eliminated but a connecting washer portion is integrated with a fastening nut; in that the connecting head is provided on the outer circumference of its lower neck portion with an at least two-stepped portion having no slope; and in that the connecting washer portion of the fastening nut is provided with a stepped portion corresponding wholly or partially to the stepped portion of the connecting head, so that the stepped portions may abut against each other.

On the other hand, the high-pressure fuel injection pipe of the invention is characterized in that the stepped portion formed on the back face of the connecting head has an angle of inclination θ of 20 degrees to 50 degrees with respect to the pipe axis.

Specifically, the invention is given such a structure that the connecting washer to cover the outer circumference of the lower neck portion of the connecting head is provided with the stepped portion, and that the connecting head is provided on its back face with the stepped portion corresponding wholly or partially to the stepped portion of the connecting washer, so that the stepped portions may abut against each other. As a result, the wedge effect due to the slope can be eliminated to prevent the plastic deformation of the connecting washer (e.g., the washer or the sleeve washer) in the radially expanding direction so that the interference between the washer and the inner circumference of the box nut and the drop of the seal face pressure can be prevented to provide a high seal performance. Moreover, the annular groove (or the pocket) to be formed in the inner side of the head by the buckling work is also made shallow and gentle. Thus, the value of the stress to occur in the pocket at a high-pressure load time is lowered to improve the internal pressure fatigue strength.

In the invention, the stepped portion on the back face of the connecting head is given the angle of inclination θ of 20 degrees to 50 degrees with respect to the pipe axis. This reason is explained in the following. At an angle less than 20 degrees, there is an effect that the pocket can have a shallow and gentle section, but the washer or the fastening nut is elongated to deteriorate the mountability and increase the weight. At an angle more than 50 degrees, on the other hand, the pocket is deep but not gentle as in the prior art with the resulting poor effect.

The high-pressure fuel injection pipe according to the invention is given the structure, in which the stepped portion having no slope is formed on the back face of the connecting head and in which the stepped portion corresponding wholly or partially to the stepped portion of the connecting head is formed in the contact type connecting washer or fastening nut to cover the back face of the connecting head. As a result, the wedge effect due to the slope can be eliminated to prevent the plastic deformation of the connecting washer (e.g., the washer or the sleeve washer) or the fastening nut so that the interference between the sleeve washer and the inner circumference of the box nut and the drop of the seal face pressure can be prevented to provide a high seal performance. Moreover, the annular groove (or the pocket) to be formed in the inner side of the head by the buckling work is also made shallow and gentle thereby to eliminate the fear of cavitation erosion, as might otherwise be caused in the inner side of the head due to the hydraulic pressure. Another excellent effect is to reduce the possibility of starting the fatigue failure drastically. According to the results of our FEM (Finite Element Method) analyses, it has been found out that the high-pressure fuel injection pipe according to the invention can have an effect of a less residual stress in the pocket and a less strain in the inner surface than those of the high-pressure fuel injection pipe of the prior art.

BEST MODE FOR CARRYING OUT THE INVENTION

In FIG. 1 to FIG. 11: reference numeral 1 designates a thick steel pipe; numerals 2-1 and 2—2 a connecting head; numerals 2-1a and 2-2a a seat face; numeral 2-2a' a curved groove; numerals 2-1b, 3-1, 3a-1, 3b-5, 3c-1 and 7a-1 a stepped portion; numerals 3, 3a and 3b a washer; numeral 3c a sleeve washer; numeral 4 an annular groove; numerals 5 and 15 a chuck; numeral 6 a punch member; numerals 7 and 7a a fastening nut; and numerals 8 and 8a a clearance.

The thick steel pipe 1 is formed of a relatively small-diameter thick tube, which is made of a carbon steel material or a stainless steel material precut to a predetermined size for the high-pressure fuel injection pipe and which has a diameter of about 4 mm to 20 mm and a thickness of about 1 mm to 8 mm.

Figure 1:
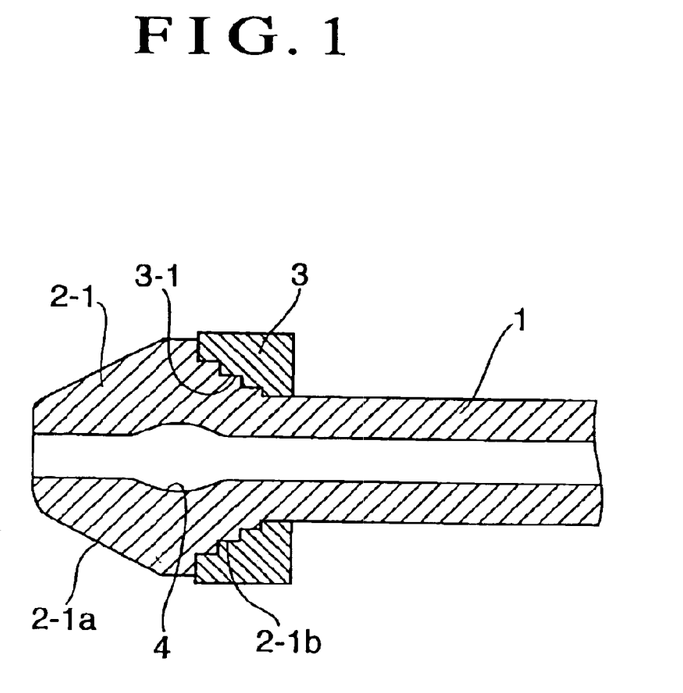
FIG. 1 is a longitudinal section showing one embodiment of the assembled state of the connecting head of a high-pressure fuel injection pipe according to the invention with a washer.

The high-pressure fuel injection pipe shown in FIG. 1 is given such a structure that the thick steel pipe 1 is provided at its connecting end portion with the connecting head 2-1 having an outer circumference formed into the frustrum seat face 2-1a for a mating seat portion, that the stepped portion 2-1b having no slope is formed on the outer circumference of the lower neck portion of the connecting head, and that the contact type integral washer 3, which is provided at the open end portion to cover that stepped portion 2-1b with the slope-less stepped portion 3-1 matching the stepped portion 2-1b, is to abut against the connecting head 2-1. The annular groove 4 is contoured to have such a section as is shallow on the inner side and gentle.

Figure 2:
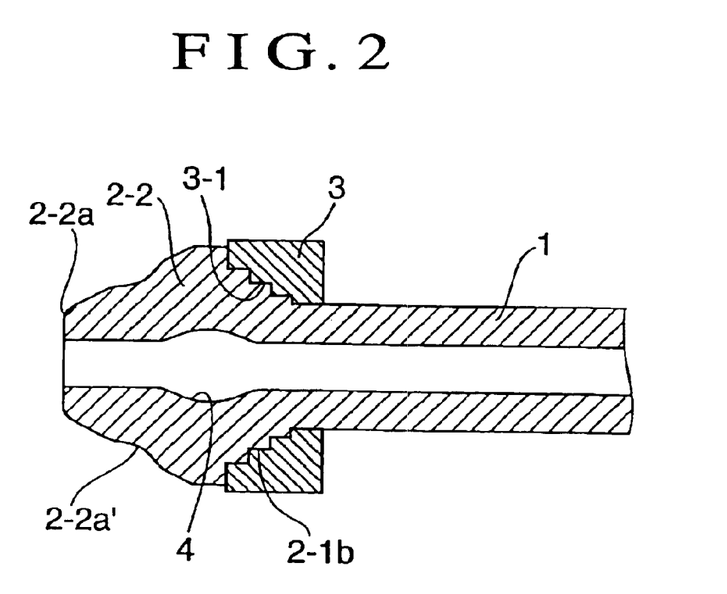
FIG. 2 is a longitudinal section showing another embodiment of the assembled state of the connecting head of a high-pressure fuel injection pipe of the invention with a washer.

The high-pressure fuel injection pipe shown in FIG. 2 is given the same structure as that of FIG. 1, excepting that the shallower annular curved groove 2-2a' is formed in a portion of the frustrum seat face of the connecting head 2—2 thereby to make the annular groove 4 shallower and gentler. In this structure, the contact type integral washer 3, which is provided with the slope-less stepped portion 3-1 at the open end portion to cover the outer circumference of the lower neck portion of the connecting head, is to abut against the connecting head 2—2 which has the stepped portion 2-1b to match the stepped portion 3-1 of the washer 3.

Figure 3:
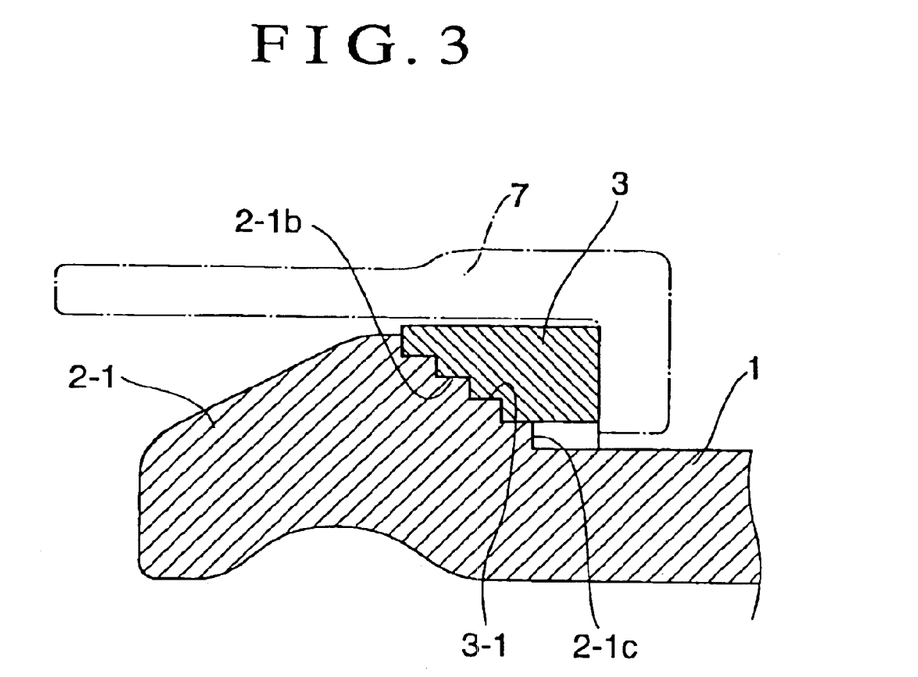
FIG. 3 is an enlarged half of the longitudinal section showing still another embodiment of the assembled state of the connecting head of a high-pressure fuel injection pipe of the invention with a washer.

The high-pressure fuel injection pipe shown in FIG. 3 is given the structure, in which the integral washer 3, which has the stepped portion 3-1 formed not to abut against only the root portion 2-1c of the stepped portion, is to abut against the stepped portion 2-1b which is formed on the back face of the connecting head 2-1. In the assembling procedure to be used for this structure, for example, with the contact type integral washer 3 having the stepped portion 3-1 being fitted beforehand around the thick steel pipe 1, the connecting head 2-1 having the stepped portion 2-1b is formed at the thick steel pipe 1, and the integral washer 3 is then brought into abutment against the stepped portion 2-1b of the connecting head 2-1.

Figure 4:
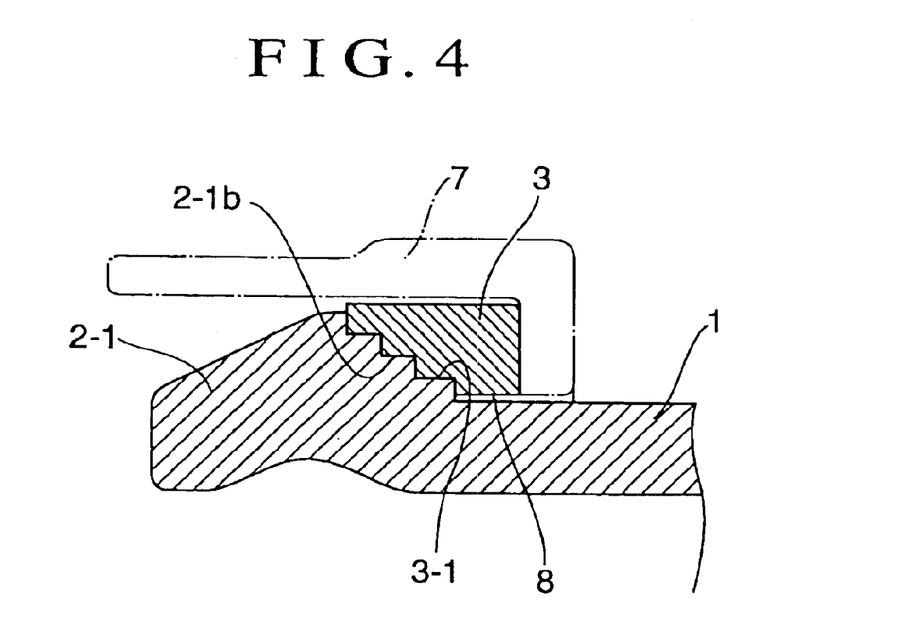
FIG. 4 is an enlarged half of the longitudinal section showing still further embodiment of the assembled state of the connecting head of a high-pressure fuel injection pipe of the invention with a washer.

Moreover, the high-pressure fuel injection pipe shown in FIG. 4 is structurally similar to those of FIG. 1 and FIG. 2. In this case, the contact type integral washer 3 having the stepped portion 3-1 is given the structure, in which it is made to abut against the stepped portion 2-1b of the connecting head 2-1 so that the clearance 8 may be formed between the inner circumference, which does not have the stepped portion 3-1, of the integral washer 3 and the outer circumference of the thick steel pipe 1. In the assembling procedure to be used for this structure, for example, as in the embodiment of FIG. 3, with the contact type integral washer 3 having the stepped portion 3-1 being fitted beforehand around the thick steel pipe 1, the connecting head 2-1 having the stepped portion 2-1b is formed at the thick steel pipe 1, and the integral washer 3 is then brought into abutment against the stepped portion 2-1b of the connecting head 2-1.

Figure 5:
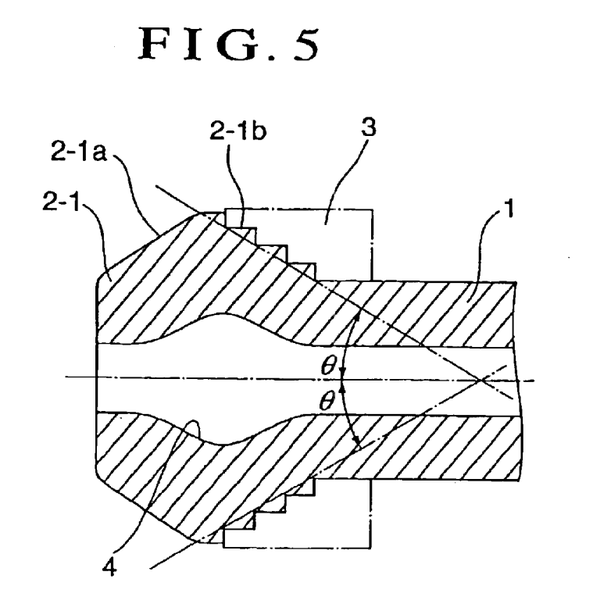
FIG. 5 is an explanatory diagram showing the angle of inclination of the back face of the connecting head in the high-pressure fuel injection pipe of the invention.
Figure 6:
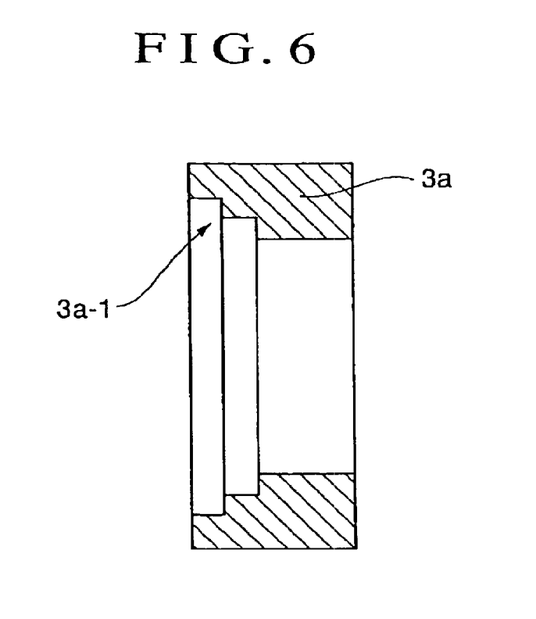
FIG. 6 is a longitudinal section showing one example of an integral washer of a different section shape of the invention.
Figure 7:
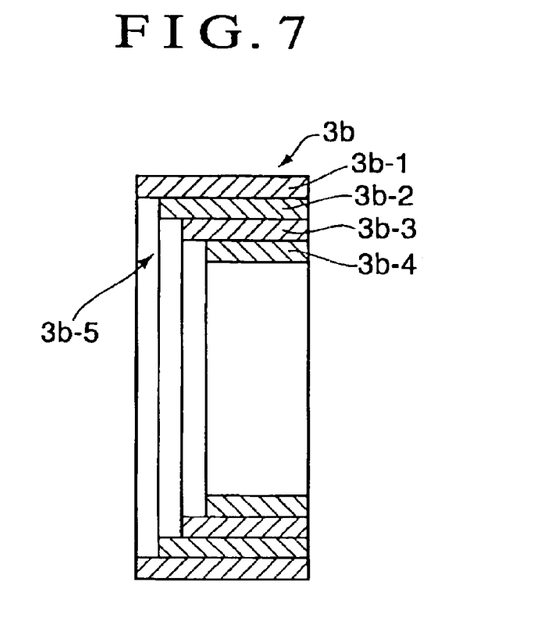
FIG. 7 is a longitudinal section showing one example of a split washer of the invention in an enlarged scale.

The stepped portion 2-1b to be formed on the back face of the connecting head 2-1 of the invention has an angle of inclination $\theta$ of 20 degrees to 50 degrees, preferably, 25 degrees to 40 degrees with respect to the pipe axis, as shown in FIG. 5. Meanwhile, said stepped portion 2-1b can be so structured that said angle of inclination with respect to the pipe axis, could be varied, not only in the linear way.

As the washer 3 of the invention, on the other hand, there can also be used in addition to those shown in FIG. 1 to FIG. 4 the integral washer 3a, which is provided with the slope-less two-stepped portions 3a-1 at the open end portion to abut against the back face of the connecting head 2—2. In the case of this washer 3a, it goes without saying that the back face of the lower neck portion of the connecting head is provided with the two steps (although not shown) corresponding to at least the two-stepped portion 3a-1 of the washer.

All the washers 3 and 3a shown in FIG. 1 to FIG. 6 are of the integral type, but the invention can use not only the integral type but also a split type washer. The washer 3b shown in FIG. 7 exemplifies the split washer, which has the stepped portion composed of a plurality of sleeves of different diameters and lengths. This split washer 3b forms a stepped portion 3b-5 by overlapping and integrating a plurality of thin sleeves 3b-1, 3b-2, 3b-3 and 3b-4 of different diameters one on the other. Here is shown the split washer, which is composed of the four sleeves. However, the split washer could be constructed, for example, either of two or three sleeves or by combining one-stepped or more-stepped sleeves.

Figure 8:
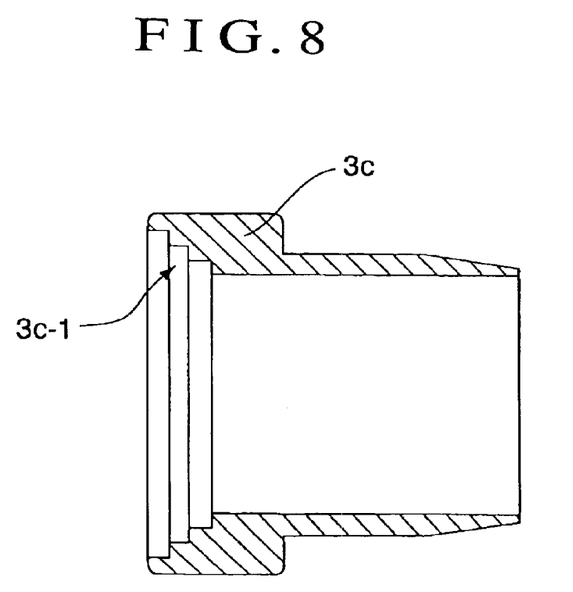
FIG. 8 is a longitudinal section showing a sleeve washer of the invention in an enlarged scale.

On the other hand, the sleeve washer 3c shown in FIG. 8 exemplifies the integral sleeve washer, which is provided with the three-stepped portion 3c-1 at the open end portion to cover the back face of the lower neck portion of the connecting head. In this case of the sleeve washer 3c, too, the back face of the connecting head 2-1 is constructed of three steps (although not shown) likewise having no slope.

Here, the axial length of the washers 3, 3a and 3b according to the invention should not be especially limited but is suitable at about 0.4 times to 1.5 times as large as the pipe diameter. Moreover, the step number of the stepped portion of the washers 3, 3a and 3b and the sleeve washer 3c may be suitably determined in dependence upon the axial length or size of those washers, and may be five or more for the performance and is sufficient two or three for the practice.

Figure 9:
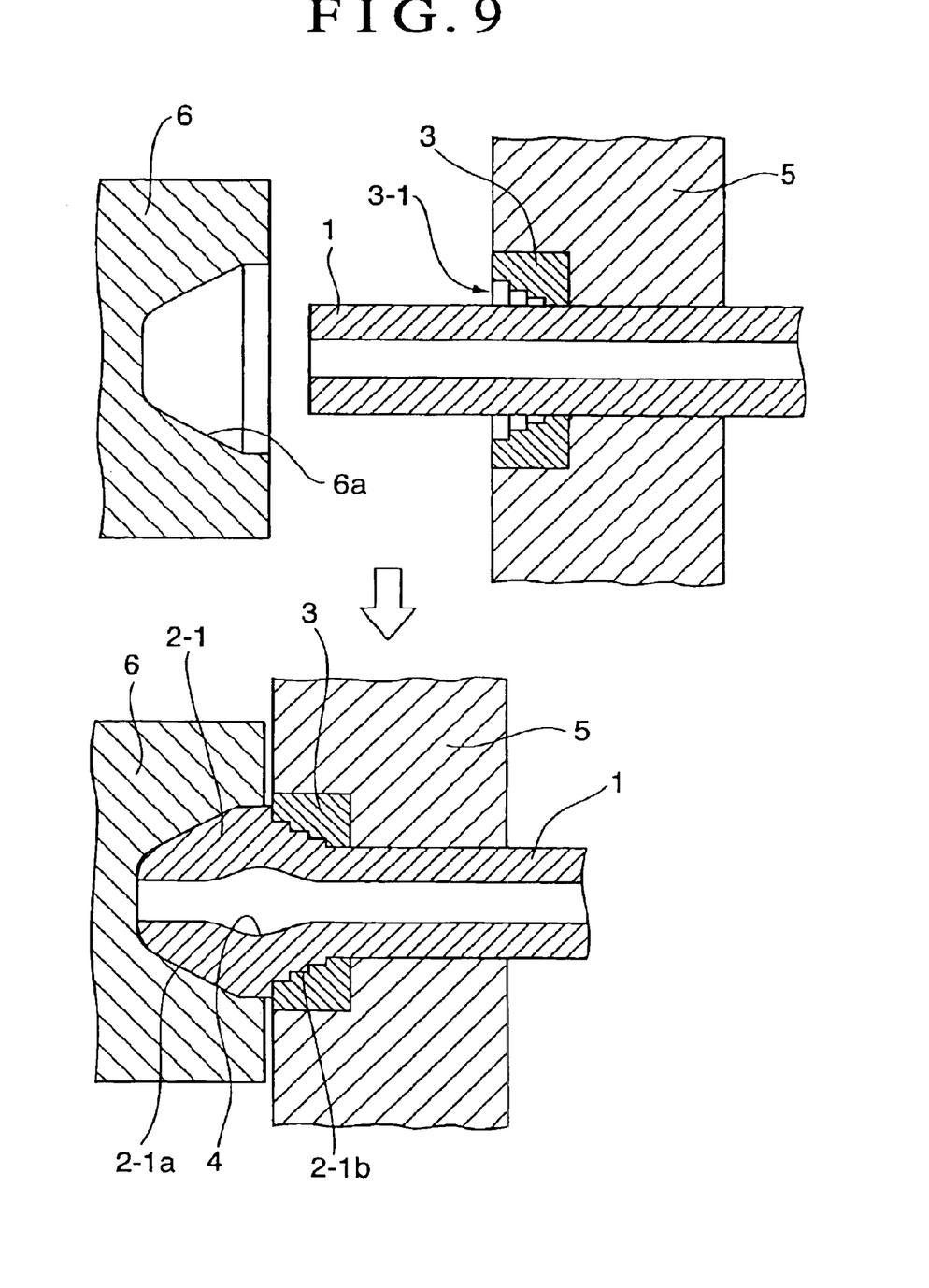
FIG. 9 is an explanatory diagram of a longitudinal section showing a working process according to a method of shaping the head of the high-pressure fuel injection pipe shown in FIG. 1.
Figure 10:
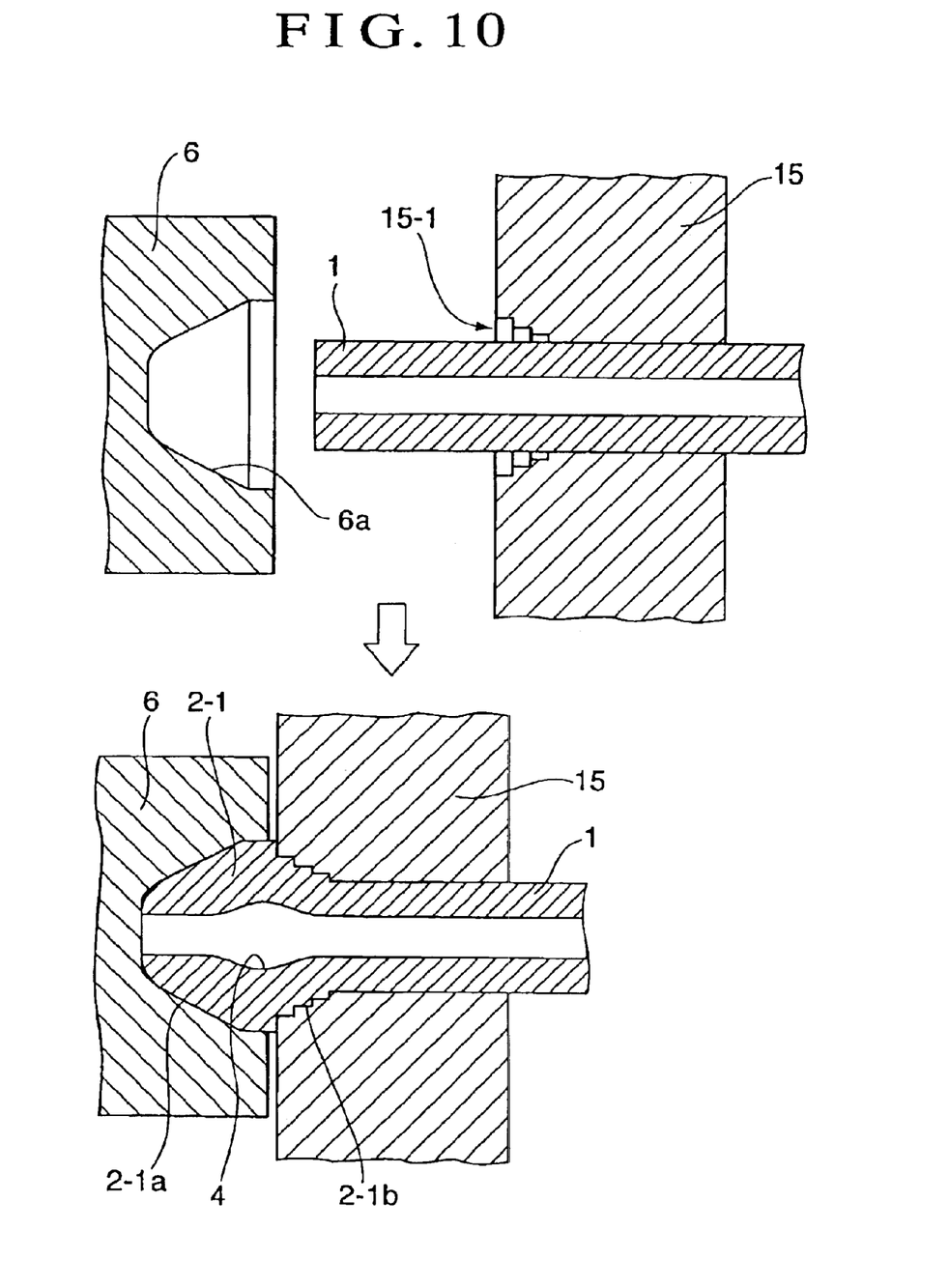
FIG. 10 is an explanatory diagram of a longitudinal section showing a working process according to another method of shaping the head of the same high-pressure fuel injection pipe.

With reference to FIG. 9 and FIG. 10, here will be described methods of shaping the head of a high-pressure fuel injection pipe according to the invention. This description is made on the case of the high-pressure fuel injection pipe shown in FIG. 1.

In the head shaping method shown in FIG. 9, on the vicinity of the connecting head of the thick steel pipe 1, the washer 3 having the generally cylindrical portion and the stepped portion 3-1 in the inner circumference on the head shaping side is fitted beforehand with a head working allowance. With the washer 3 and the thick steel pipe 1 being held in the chuck 5, the leading end portion of the steel pipe 1 is pushed in the axial direction by the punch member having a shaping hole 6a. Then, the portion of the head working allowance of the thick steel pipe 1 flows plastically into the stepped portion 3-1 of the washer 3, which is fitted beforehand in the thick steel pipe 1, thereby to shape the connecting head 2-1. Simultaneously with this, the thick steel pipe 1 comes into close contact with the inner circumference of the stepped portion 3-1 of the washer 3, and the outer circumference of the lower neck portion of the connecting head 2-1 is covered with the washer 3 having the stepped portion 3-1 thereby to form the stepped portion 2-1b matching the stepped portion 3-1 of the washer 3. At the same time, the connecting head 2-1, which has such a frustrum seat face 2-1a as is made spherical for the mating seat portion (although not shown), is obtained at the leading end portion of the thick steel pipe 1.

On the other hand, the head shaping method shown in FIG. 10 is to shape the connecting head having the stepped portion by using not the washer but only the chuck. In this shaping method, more specifically, there is used the chuck 15, which has a stepped portion 15-1 for forming the stepped portion 2-1b on the back face of the connecting head 2-1, is used, and the leading end portion of the steel pipe 1 is pushed in the axial direction by the punch member 6 having the shaping hole 6a. At this time, the portion of the head working allowance of the thick steel pipe 1 flows plastically into the stepped portion 15-1 of the chuck 15 thereby to shape the connecting head 2-1. Simultaneously with this, the thick steel pipe 1 comes into close contact with the inner circumference of the stepped portion 15-1 of the chuck 15, and the stepped portion 15-1 covers the outer circumference of the lower neck portion of the connecting head 2-1 thereby to form the stepped portion 2-1b matching the stepped portion 15-1. At the same time, the connecting head 2-1, which has the frustrum seat face 2-1a for the mating seat portion (although not shown), is obtained at the leading end portion of the thick steel pipe 1.

In the head shaping methods shown in FIG. 9 and FIG. 10, the slope-less stepped portions 3-1 and 15-1 of the washer 3 and the chuck 15 restrain the external diameter of the shaped portion, so that the annular groove 4, which is formed in the inner circumference of the head by the outward expansion of the circumferential wall accompanying the buckling work by the push of the punch member 6, is contoured to have the shallow and gentle section.

Here in the case of the high-pressure fuel injection pipe shown in FIG. 2, with a view to forming the connecting head 2—2 having the shallow annular curved groove 2-2a′ in the portion of the seat face, the connecting head is shaped by a method similar to the aforementioned one excepting the use of the punch member 6 having the bulging portion for forming that curved groove 2-2a′. In the case of this high-pressure fuel injection pipe, therefore, it goes without saying that the annular groove 4, which is formed in the inner circumference of the head by the outward expansion simultaneously as the seat face 2-1*a* or 2-2*a* or the curved groove 2-2*a'* is formed in the buckling work by the push of the punch member 6, is contoured to have the shallow and gentle section.

When the fastening nut 7 is fastened at the pipe connecting time, moreover, the connecting fixture such as the washer 3, 3*a* or 3*b* or the sleeve washer 3*c* is subject to the axial force, and receives a torque according to a coefficient of friction between the fastening nut and the working face. By this torque received, the connecting fixture is twisted to absorb the twisting energy together with the injection pipe contacting with the inner circumference of the connecting fixture. In case the injection pipe is excessively fastened with a high torque as the injection pressure becomes high, the axial force, as generated by the excessive fastening torque, is absorbed between the stepped portion 2-1*b* of the connecting head 2-1 or 2—2 and the end face of the stepped portion 3-1, 3*a*-1, 3*b*-5 or 3*c*-1 of the washer or the sleeve washer, so that the expansion of the washer or the sleeve washer is suppressed. Therefore, the washer or the sleeve washer is prevented from being plastically deformed to have a large external diameter thereby to interfere with the inner circumference of the box nut.

All the high-pressure fuel injection pipe shown in FIG. 1 to FIG. 9 are provided with the washer or the sleeve washer, but the invention could also be applied to the high-pressure fuel injection pipe having no washer.

Figure 11:
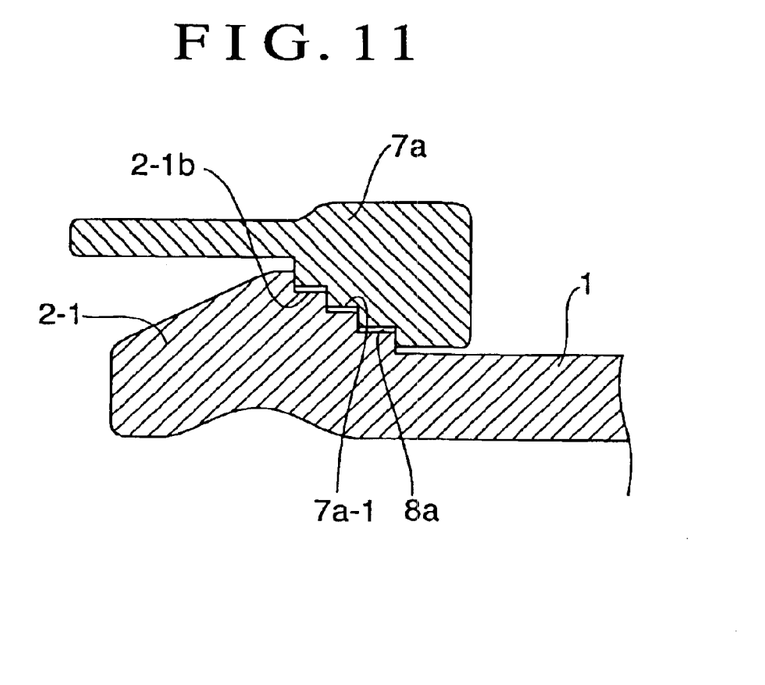
FIG. 11 is a half of the longitudinal section showing one embodiment of the assembled state of the connecting head of a high-pressure fuel injection pipe having no washer of the invention with a fastening nut.

One example of this application is shown in FIG. 11. This high-pressure fuel injection pipe is given the structure, in which the fastening nut 7*a* is provided with a stepped portion 7*a*-1 corresponding to the stepped portion 2-1*b* formed on the back face of the connecting head on the inner circumference which is thickened by forming the washer portion integrally, and is made to abut against the stepped portion 2-1*b* of the connecting head 2-1, so that the clearance 8*a* may be formed in the axial step of each stepped portion. In the assembling procedure of that structure, like that shown in FIG. 10, for example, the connecting head 2-1 having the stepped portion 2-1*b* is shaped at the thick steel pipe 1. After this, the fastening nut 7*a* having the stepped portion 7*a*-1 is brought into abutment against the stepped portion 2-1*b* of the connecting head 2-1.

Here, the reason why the clearance 8*a* is formed at the axial step of each stepped portion in this washer-less high-pressure fuel injection pipe is to reduce the fastening torque of the fastening nut 7*a*.

In the case of the washer-less high-pressure fuel injection pipe, the axial force acts directly on the connecting head 2-1 as the fastening nut 7*a* is fastened at the pipe connecting time. In case the injection pipe is excessively fastened with a high torque as the injection pressure becomes high, the axial force, as generated by the excessive fastening torque, is absorbed between the stepped portion 2-1*b* of the connecting head 2-1 and the end face of the stepped portion 7*a*-1 of the fastening nut 7*a*, so that the expansion of the fastening nut 7*a* is suppressed. Therefore, the fastening nut 7*a* is prevented from being plastically deformed to have a large external diameter.

INDUSTRIAL APPLICABILITY

According to the invention, as has been described hereinbefore, the high-pressure fuel injection pipe according to the invention is given the structure, in which the stepped portion having no slope is formed on the back face of the connecting head and in which the stepped portion corresponding wholly or partially to the stepped portion of the connecting head is formed in the contact type connecting washer or fastening nut to cover the back face of the connecting head. As a result, the wedge effect due to the slope can be eliminated to prevent the plastic deformation of the connecting washer (e.g., the washer or the sleeve washer) or the fastening nut so that the drop of the seal face pressure can be prevented to provide a high seal performance. Moreover, the annular groove (or the pocket) to be formed in the inner side of the head by the buckling work is also made shallow and gentle thereby to eliminate the fear of cavitation erosion, as might otherwise be caused in the inner side of the head due to the hydraulic pressure. Another excellent effect is to reduce the possibility of starting the fatigue failure drastically. Thus, it is possible to provide the high-pressure fuel injection pipe, which is frequently used as the fuel feed passage in the diesel engine, for example, and which has the connecting head made of the thick steel pipe having the relatively small diameter of 4 mm to 20 mm and a thickness of about 1 mm to 8 mm.

What is claimed is:

1. A high-pressure fuel injection pipe having a connecting head, comprising: a thick steel pipe having a relatively small diameter and provided at its connecting end portion with a connecting head having an outer circumference formed into a seat face of either a frustrum shape or a frustrum shape having a spherical leading end portion for a mating seat portion, such that an annular groove formed in the inner side of said connecting head in accordance with the shaping of said head is of a shallow gently curvilinear contour and a connecting washer fitted on the outer circumference of a lower neck portion of said connecting head, wherein said connecting head is provided on the outer circumference of its lower neck portion with an at least two-stepped portion, and wherein said connecting washer is provided with a stepped portion corresponding at least partially to the stepped portion of said connecting head, so that the stepped portions may abut against each other.

2. The high-pressure fuel injection pipe having a connecting head according to claim 1, wherein the stepped portion formed on the outer circumference of the lower neck portion of said connecting head has an angle of inclination θ of 20 degrees to 50 degrees with respect to the pipe axis.

3. The high-pressure fuel injection pipe having a connecting head according to claim 1, wherein the stepped portion formed on the outer circumference of the lower neck portion of said connecting head has two to five steps.

4. The high-pressure fuel injection pipe having a connecting head according to claim 1, wherein said connecting washer is of either an integral type or a split type including a plurality of thin sleeves having different diameters.

5. The high-pressure fuel injection pipe having a connecting head according to claim 1, wherein said thick steel pipe is made of a carbon steel material or a stainless steel material for the high-pressure fuel injection pipe.

6. The high-pressure fuel injection pipe having a connecting head according to claim 1, wherein said thick steel pipe has sizes of a diameter of 4 mm to 20 mm and a thickness of 1 mm to 8 mm.

7. The high-pressure fuel injection pipe having a connecting head according to claim 1, wherein said connecting washer has an axial length of about 0.4 times to 1.5 times as large as the pipe diameter.

8. A high-pressure fuel injection pipe having a connecting head comprising: a thick steel pipe having a relatively small diameter and provided at its connecting end portion with a connecting head having an outer circumference formed into a seat face of either a frustrum shape or a frustrum shape having a spherical leading end portion for a mating seat portion, such that an annular groove formed in the inner side of said connecting head in accordance with the shaping of said head is of a shallow gently curvilinear contour and a connecting washer fitted on the outer circumference of a lower neck portion of said connecting head, wherein the connecting washer portion is integrated with a fastening nut, said connecting head is provided on the outer circumference of its lower neck portion with an at least two-stepped portion; and in that the connecting washer portion of said fastening nut is provided with a stepped portion corresponding at least partially to the stepped portion of said connecting head, so that the stepped portions may abut against each other.

9. The high-pressure fuel injection pipe having a connecting head according to claim 8, wherein the stepped portion formed on the outer circumference of the lower neck portion of said connecting head has an angle of inclination $\theta$ of 20 degrees to 50 degrees with respect to the pipe axis.

10. The high-pressure fuel injection pipe having a connecting head according to claim 8, wherein said thick steel pipe is made of a carbon steel material or a stainless steel material for the high-pressure fuel injection pipe.

11. The high-pressure fuel injection pipe having a connecting head according to claim 8, wherein said thick steel pipe has sizes of a diameter of 4 mm to 20 mm and a thickness of 1 mm to 8 mm.

* * * * *